US012781533B2

(12) United States Patent
Talpe

(10) Patent No.: US 12,781,533 B2
(45) Date of Patent: Nov. 3, 2026

(54) COMBINATION LOCK FOR LOCKING A CLOSURE MEMBER

(71) Applicant: LOCINOX, Waregem (BE)

(72) Inventor: Joseph Talpe, Heestert-Zwevegem (BE)

(73) Assignee: LOCINOX, Waregem (BE)

(*) Notice: Subject to any disclaimer, the term of this patent is extended or adjusted under 35 U.S.C. 154(b) by 151 days.

(21) Appl. No.: 19/018,187

(22) Filed: Jan. 13, 2025

(65) Prior Publication Data

US 2025/0243688 A1 Jul. 31, 2025

(30) Foreign Application Priority Data

Jan. 30, 2024 (EP) .................................... 24154694

(51) Int. Cl.
*E05B 9/00* (2006.01)
*E05B 37/00* (2006.01)

(52) U.S. Cl.
CPC .......... *E05B 9/002* (2013.01); *E05B 37/0044* (2013.01); *E05B 37/0048* (2013.01)

(58) Field of Classification Search
CPC .. E05B 9/002; E05B 37/0044; E05B 37/0048; E05B 37/16; E05B 13/004; Y10T 70/8324; Y10T 70/8514
USPC .......................... 70/156, 160–163, 167–169
See application file for complete search history.

(56) References Cited

U.S. PATENT DOCUMENTS

2008/0115546 A1* 5/2008 Hu ........................ E05B 13/004 70/214
2009/0013737 A1 1/2009 Talpe

FOREIGN PATENT DOCUMENTS

EP 2886755 A1 6/2015
GB 2343482 A * 5/2000 ............. E05B 37/16

OTHER PUBLICATIONS

European Search Report for EP Application No. 24154694, dated Jul. 10, 2024, 4 pages.

* cited by examiner

*Primary Examiner* — Suzanne L Barrett
(74) *Attorney, Agent, or Firm* — Dickinson Wright PLLC

(57) ABSTRACT

The disclosure provides a combination lock for locking a closure member. The combination lock comprises a lock assembly comprising a latch bolt and a latch bolt actuating mechanism moveable between a rest state and an actuated state and the combination lock comprising a combination locking mechanism moveable between a blocking state and an unblocking state, and comprises a frame, a combination input means, a combination alteration means, and a cover. The cover is moveably mounted on the frame between an open position in which the combination alteration means are accessible by a user, and a closed position in which the combination alteration means are not accessible by a user, and the cover is moveable from its closed position to its open position when the combination locking mechanism is in its unblocking state and the latch bolt actuation mechanism is in its actuated state.

19 Claims, 11 Drawing Sheets

COMBINATION LOCK FOR LOCKING A CLOSURE MEMBER

CROSS-REFERENCE TO RELATED APPLICATION(S)

This present application claims priority to European Patent Application No. EP24154694.4, filed Jan. 30, 2024, the disclosure of which is hereby incorporated by reference in its entirety.

TECHNICAL FIELD

The present disclosure relates to a combination lock for locking a closure member.

BACKGROUND

Combination locks, for example pushbutton combination locks, are known in the state of the art. EP2886755 relates to a pushbutton combination lock comprising a lock assembly configured to be mounted on a closure member. The lock comprises a latch bolt moveable between a latched position and an unlatched position, and a latch bolt actuating mechanism moveable between a rest state and an actuated state and configured to move the latch bolt from its latched position to its unlatched position. The pushbutton combination lock further comprises a combination locking mechanism moveable between a blocking state and an unblocking state and configured to prevent the latch bolt actuating mechanism to move the latch bolt from its latched position when the combination locking mechanism is in its blocking state and to allow the latch bolt actuating mechanism to move the latch bolt from its latched position when the combination locking mechanism is in its unblocking state. The combination locking mechanism comprises a frame, a combination input means mounted on the frame and configured to move the combination locking mechanism to its unblocking state upon receiving a combination as input, a combination alteration means mounted on the frame and configured to allow a user to alter the combination, and a cover.

The pushbutton combination lock known from EP2886755 however has the disadvantage that a user cannot access the combination alteration means for changing the pushbutton combination without adapted tooling and without disassembling the pushbutton combination lock, in particular without disassembling the combination input means.

SUMMARY

It is an aim of the present disclosure to provide a combination lock which partially alleviates one or more of the above-mentioned problems.

This aim is achieved according to the disclosure with a combination lock for locking a closure member, such as a gate, a door, or a window. The combination lock comprises a lock assembly configured to be mounted on the closure member and a combination locking mechanism. The lock assembly comprises a latch bolt moveable between a latched position and an unlatched position. Preferably, the latch bolt is slidable between the latched position and the unlatched position. Alternatively, the latch bolt is rotatable between the latched position and the unlatched position.

The lock assembly further comprises a latch bolt actuating mechanism moveable between a rest state and an actuated state and configured to move the latch bolt from its latched position to its unlatched position. Preferably, the latch bolt actuation mechanism comprises a handle. Alternatively, the latch bolt actuation mechanism comprises any type of driver for lock assemblies on a closure member known from the state of the art, such as a push bar, a button, a push lever, a pull lever, or the like.

The combination locking mechanism is moveable between a blocking state and an unblocking state and configured to prevent the latch bolt actuating mechanism to move the latch bolt from its latched position when the combination locking mechanism is in its blocking state and to allow the latch bolt actuating mechanism to move the latch bolt from its latched position when the combination locking mechanism is in its unblocking state.

The combination locking mechanism comprises a frame, and a combination input means mounted on the frame and configured to move the combination locking mechanism to its unblocking state upon receiving a combination as input. Preferably, the combination input means comprise a pushbutton keyboard, preferably comprising a tumbler comprising a base body, a code part, and a tumbler driver part. Alternatively, the combination input means comprise a series of dials, or any combination lock mechanism combination input means known from the state of the art.

The combination locking mechanism comprises also a combination alteration means mounted on the frame and configured to allow a user to alter the combination, and a cover. Preferably, the combination alteration means comprise a means for changing the code part of the tumbler of the combination input means. Alternatively, the combination alteration means are other combination alteration means known from the state of the art, such as combination alteration means comprising the use of a change key.

The cover is moveably mounted on the frame between an open position in which the combination alteration means are accessible by a user, and a closed position in which the combination alteration means are not accessible by a user. The cover is moveable from its closed position to its open position only when the combination locking mechanism is in its unblocking state.

It is an advantage of the present disclosure that the combination alteration means can be accessed by a user without any tooling. The user can access the combination alteration means by entering a combination using the combination input means and opening the cover towards its open position. It is a further advantage of the disclosure that the combination alteration means are not accessible when the cover is in its closed position, ensuring that a person without knowledge of the combination, cannot alter the combination locking mechanism. It is possible to access the combination alteration means without opening the closure member.

Optionally, the combination locking mechanism comprises a cover locking means moveable between a locking state in which the cover, when in its closed position, is prevented from leaving its closed position, to an unlocking state in which the cover is allowed to move to its open position.

Optionally, the cover locking means are in their locking state when the combination locking mechanism is in its blocking state, and when the combination locking mechanism is in its unblocking state and the latch bolt actuation mechanism is in its rest state. The cover locking means are in their unlocking state when the combination locking mechanism is in its unblocking state and the latch bolt actuation mechanism is in its actuated state.

This has the additional advantage that the cover locking means cannot be brought into their unlocking state merely by entering the right combination, but requires further action of the user, in particular actuating the latch bolt actuation mechanism. Especially in combination with a latch bolt actuation mechanism that resets the combination locking mechanism to its blocking state when the latch bolt actuation mechanism is operated, it has the further advantage that the cover locking means are returned to their blocking state after the closure member is opened using the latch bolt actuating mechanism. Hence the cover locking means are not inadvertently left open.

Optionally the cover locking means comprise a catch mounted on the cover and a catch keeper mounted on the frame and configured to keep the catch when the cover locking means is in its locking state and the cover is in its closed position. Alternatively, the catch is mounted on the frame and the catch keeper is mounted on the cover.

Optionally, the catch keeper is moveably connected to the frame between a keeping position and a releasing position, the cover locking means further comprising a catch keeper biasing member biasing the catch keeper to its keeping position. The catch keeper biasing member comprises by preference a compression spring. Alternatively, it comprises a torsion spring, an extension spring, a weight or any other biasing means known from the state of the art. The catch keeper keeps the catch when the catch keeper is in the keeping position and the cover is in its closed position. The catch keeper is configured to be urged against the catch keeper biasing member into its releasing position, when the cover locking means are in the locking state and the cover moves from an open to a closed position.

This has the additional advantage that the moving parts of the cover locking means, preferably the catch keeper, are mounted on the frame rather than on the cover, leading to a simpler cover design that weighs less. It is an additional advantage that the cover locking means are self-latching, enabling the cover to be moved from an open to a closed position when the cover locking means are in the locking state, after which the cover stays in its closed position. When the cover locking means are in the locking state, closing the cover locks it.

Preferably, the catch comprises a striker bolt extending between a first striker bolt end and a second striker bolt end with the striker bolt being mounted on the cover at the first striker bolt end, the striker bolt comprising a recess, by preference a groove, by further preference a circumferential groove, and the catch keeper comprises a free end extending into the recess when the catch keeper is in its keeping position and the cover is in its closed position.

This has the additional advantage that the installation of the striker bolt is simplified. By the circumferential nature of the groove, the exact orientation of the striker bolt with regard to the free end of the catch keeper is of no consequence: no matter how the striker bolt is installed, free end of the catch keeper extends into the recess when the catch keeper is in its keeping position and the cover is in its closed position.

Preferably, the striker bolt comprises a bevel at the second striker bolt end and the free end of the catch keeper comprises a bevel, the striker bolt bevel being configured to engage with the catch keeper bevel to urge the catch keeper against the catch keeper biasing member into its releasing position when the cover moves from an open to a closed position.

This has the additional advantage, in particular if the striker bolt movement when moving the cover from its open to its closed position is transversal to the motion of the catch keeper between the keeping position and the releasing position, that the motion of the striker bolt can be converted in the motion of the catch keeper with a simple mechanical setup involving only the striker bolt and the catch keeper. In addition, because the mechanical shape of the striker bolt and the catch keeper naturally covert the movement of the striker bolt into a transversal motion of the catch keeper, it is hard to exert a force on the catch keeper with the striker bolt in a direction that would damage the combination locking mechanism, extending the combination locking mechanism's lifetime.

Optionally, the combination locking mechanism further comprises: a check slide slidably mounted on the frame between a checking position in which the check slide is configured to prevent rotation of the latch bolt actuating mechanism, and an unchecking position, and a check slide biasing member biasing the check slide to its checking position, wherein the check slide is slidable when the combination locking mechanism is in its unblocking state, and wherein the check slide is fixed in its checking position when the combination locking mechanism is in its blocking state, and wherein the check slide is also part of the cover locking means with the checking position corresponding to the locking state and the unchecking position corresponding to the unlocking state. The check slide biasing member comprises by preference a compression spring. Alternatively, it comprises a torsion spring, an extension spring, a weight or any other biasing means known from the state of the art.

Using a check slide as part of the combination locking mechanism is a known and reliable solution to prevent the latch bolt actuation. Using this same check slide as part of the cover locking mechanism adds an additional safety functionality without requiring additional components to be provided.

Preferably, the cover locking means further comprise a manually operable actuator, such as a pushbutton or a rotatable knob, operatively connected to the check slide and configured for moving the check slide to its unchecking position. The manually operable actuator may be part of the latch bolt actuating mechanism.

This has the additional advantage that the cover locking means cannot be brought into their unlocking state merely by entering the right combination, but requires further action of the user, for example actuating the latch bolt actuation mechanism or actuating the separate pushbutton or rotatable knob.

Preferably, the latch bolt actuating mechanism comprises a spindle rotatably connected to the lock assembly and configured to be moved by a driver, and the combination locking mechanism further comprises a check slide slidably mounted on the frame between a checking position in which the check slide is configured to prevent rotation of the spindle, and an unchecking position, and a check slide biasing member biasing the check slide to its checking position, wherein the check slide is slidable when the combination locking mechanism is in its unblocking state, and wherein the check slide is fixed in its checking position when the combination locking mechanism is in its blocking state. The check slide biasing member comprises by preference a compression spring. Alternatively, it comprises a torsion spring, an extension spring, a weight or any other biasing means known from the state of the art.

Optionally, a spindle follower is mounted on the spindle, the spindle follower having a non-cylindrical outer surface which defines a spindle follower engagement surface, and the check slide comprises a check slide engagement surface, the check slide engagement surface abutting the spindle follower engagement surface when the check slide is in its checking position.

Preferably, when the latch bolt actuating mechanism is moved from its rest state to its actuated state and the combination locking mechanism is in its unblocking state, the spindle follower is configured to move the check slide to its unchecking position.

Optionally, the catch keeper is mounted on the check slide, preferably moveably mounted on the check slide, more preferably slidably mounted on the check slide, wherein the catch keeper is in its releasing position when the check slide is in its unchecking position.

This has the additional advantage that the catch keeper is moved to its releasing position by the check slide, avoiding the need to add a separate mechanism to translate the motion of the latch bolt actuating mechanism into a motion of the catch keeper.

Optionally, the combination lock further comprises a securing means configured to detachably connect the cover to the frame, the securing means moveable from a secured state in which the cover, when in its closed position, is prevented from leaving its closed position, to an unsecured state in which the cover is allowed to move to its open position. The securing means comprise for example any one of or a combination of a threaded bolt, a cylinder lock, a lever, and a latch.

This has the additional advantage, in particular if the lock is used by multiple users, that one user, such as an administrator, is able to limit the access to the combination alteration means to specific users and/or to specific time periods.

By preference, the cover is pivotally connected to the frame, the combination locking mechanism further comprising temporary fixation means configured to hold a free end of the cover when the cover is in its open position. Preferably the temporary fixation means comprise a leaf spring. Alternatively, the temporary fixation means comprise a torsion spring, or a magnet, preferably a permanent magnet, and a magnetic catch, or another means known from the state of the art to keep a cover in its open position. A magnetic catch is an element or part thereof which is attracted by a magnet, for example an element or part thereof manufactured from a ferromagnetic, optionally soft ferromagnetic, or ferrimagnetic material.

This has the additional advantage that a user does not have to operate the combination alteration means while the cover is trying to move to its closed position. The access to the combination alteration means is made more comfortable. This is of particular interest when the combination locking mechanism comprises a cover biasing member biasing the cover to its closed position.

Optionally, the cover extends between a first cover end and a second cover end in a longitudinal cover direction, and the cover is connected to the frame with a revolute joint, for example a pin joint or a pivot joint, the axis of rotation of the revolute joint being transverse to the longitudinal cover direction and located between the first cover end and the second cover end.

This has the additional advantage that it is easier to make the cover fit the frame, so that no tools for prying can be inserted between the cover edge and the frame, while ensuring that the frame does not inhibit opening the cover by blocking the cover edge when the cover is being opened with a rotational movement. In addition, internal recesses in the frame that enable the cover to be rotationally opened unhindered by the frame have a smaller curvature if the rotational joint is not placed at one of the cover ends, and hence are easier to design, manufacture and install. The frame can be made sturdier, leaving less opportunities for tools to be forcefully inserted between the cover and the frame to pry open the cover.

Optionally, the cover is configured to be moved from its closed position to its open position by pressing the cover between the first cover end and the axis of rotation of the revolute joint.

This has the additional advantage that a cover can be opened by pressing it, so there is no need to add features to the cover that enable a user to catch it in order to open it. The cover design can be kept simpler. Omitting features from the cover that enable a user to catch it in order to open it also increases the security of the lock, as there are less opportunities for tools to catch on the cover to force it open.

Preferably, the combination locking mechanism comprises a cover biasing member biasing the cover to its closed position. For example, the cover biasing member comprises a torsional spring, an extension spring or any other cover biasing means known from the state of the art biasing a cover to its closed position.

This has the additional advantage that a cover when unintendedly left open, will move to its closed position. In addition, this has the advantage that the cover will not inadvertently leave its closed position because of a movement of a closure member on which the combination lock is mounted, when the cover locking means are in their unlocking state and a user operates the closure member using the driver, unless the user attempts to open the cover.

Optionally, the cover biasing member comprises a magnet, preferably a permanent magnet, and a magnetic catch, jointly biasing the cover to its closed position, especially when the cover is in its closed position. A magnetic catch is an element or part thereof which is attracted by a magnet, for example an element or part thereof manufactured from a ferromagnetic, optionally soft ferromagnetic, or ferrimagnetic material.

This has the additional advantage that the cover will not inadvertently leave its closed position because of a movement of a closure member on which the combination lock is mounted, when the cover locking means are in their unlocking state and a user operates the closure member using the driver, unless the user attempts to open the cover.

Optionally, the combination alteration means comprise a storage location for a code part of a tumbler, especially when the combination input means comprise a tumbler comprising a base body, a code part and a tumbler driver part. The code part of a tumbler comprises a threaded bolt, preferably with a head comprising an internal hexagonal recess, the code part configured to be attached to the base body of the tumbler.

Optionally, the combination alteration means comprise a hex key removably connected to the combination alteration means, especially when the combination input means comprise a tumbler with a head with an internal hexagonal recess. The hex key is configured to attach a code part of a tumbler to the base body of a tumbler.

The aim of the present disclosure is further achieved according to the present disclosure with a method for using a combination lock according to the present disclosure. The method comprises entering a combination with the combination input means, and using a driver to move the latch bolt actuating mechanism to its actuated state. Entering the combination preferably precedes using the driver.

Optionally, the method for using a combination lock according to the present disclosure comprises moving the cover to its open position, altering the combination with the combination alteration means, and optionally moving the cover to its closed position. Moving the cover to its open position preferably follows using the driver and preferably precedes altering the combination. Altering the combination preferably precedes moving the cover to its closed position.

Optionally, when the combination input means comprise a tumbler, altering the combination with the combination alteration means, comprises using a hex key to remove a code part of a tumbler from a base part of the tumbler and using a hex key to attach a code part to the base part of the tumbler. Preferably, using a hex key to remove a code part precedes using a hex key to attach a code part.

BRIEF DESCRIPTION OF THE DRAWINGS

The disclosure will be further elucidated by means of the following description and the appended figures.

DETAILED DESCRIPTION

Figures 1A, 1B, 1C:
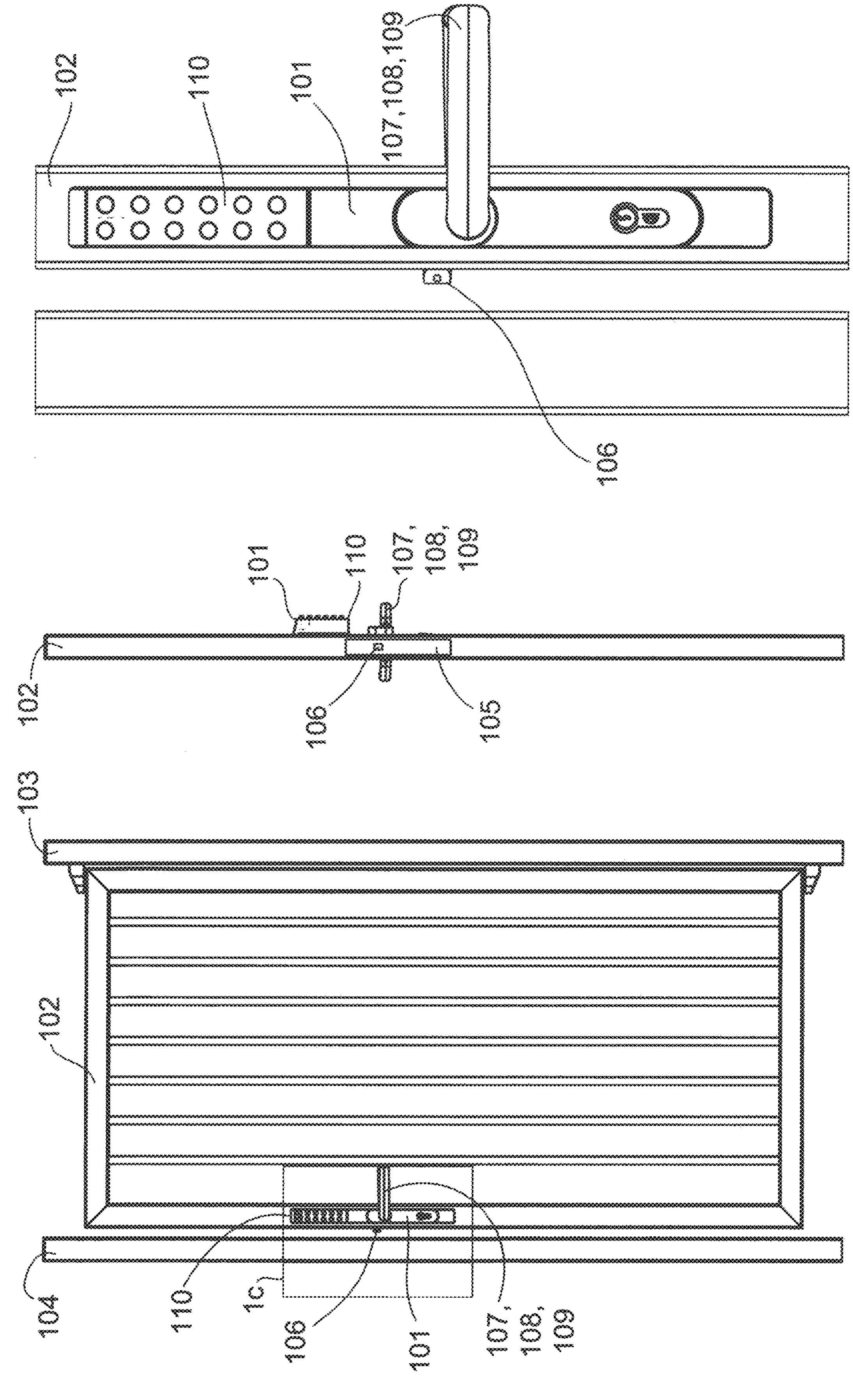
FIG. 1*a* shows a frontal view of a combination lock according to the present disclosure mounted on a closure member.
FIG. 1*b* shows a side view of a combination lock according to the present disclosure mounted on a closure member.
FIG. 1*c* shows a detail of FIG. 1*a*.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the disclosure described herein can operate in other orientations than described or illustrated herein.

The term “comprising”, used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression “a device comprising means A and B” should not be limited to devices consisting only of components A and B. It means that with respect to the present disclosure, the only relevant components of the device are A and B.

FIG. 1*a* shows a combination lock 101 according to the present disclosure mounted on a closure member 102. FIG. 1*b* shows a side view of the combination lock 101 and the closure member 102. FIG. 1*c* shows a frontal closeup of the combination lock 101 mounted on the closure member 102.

The closure member 102, in particular a gate, is attached to a fixed support 103, in particular a post. A further fixed support 104, in particular a post, is positioned opposite the fixed support 103, the closure member 102 engaging with the further fixed support 104 when the closure member 102 is closed. The combination lock 101 is mounted on the moveable closure member 102 and comprises a lock assembly 105. The lock assembly 105 comprises a latch bolt 106 moveable between a latched position and an unlatched position, and a latch bolt actuating mechanism 107, in particular a driver 108, in particular a door handle 109, moveable between a rest state and an actuated state and configured to move the latch bolt 106 from its latched position to its unlatched position. The combination lock 101 comprises a combination locking mechanism 110 moveable between a blocking state and an unblocking state and configured to prevent the latch bolt actuating mechanism 107 to move the latch bolt 106 from its latched position when the combination locking mechanism 110 is in its blocking state and to allow the latch bolt actuating mechanism 107 to move the latch bolt 106 from its latched position when the combination locking mechanism 110 is in its unblocking state.

Figure 2A:
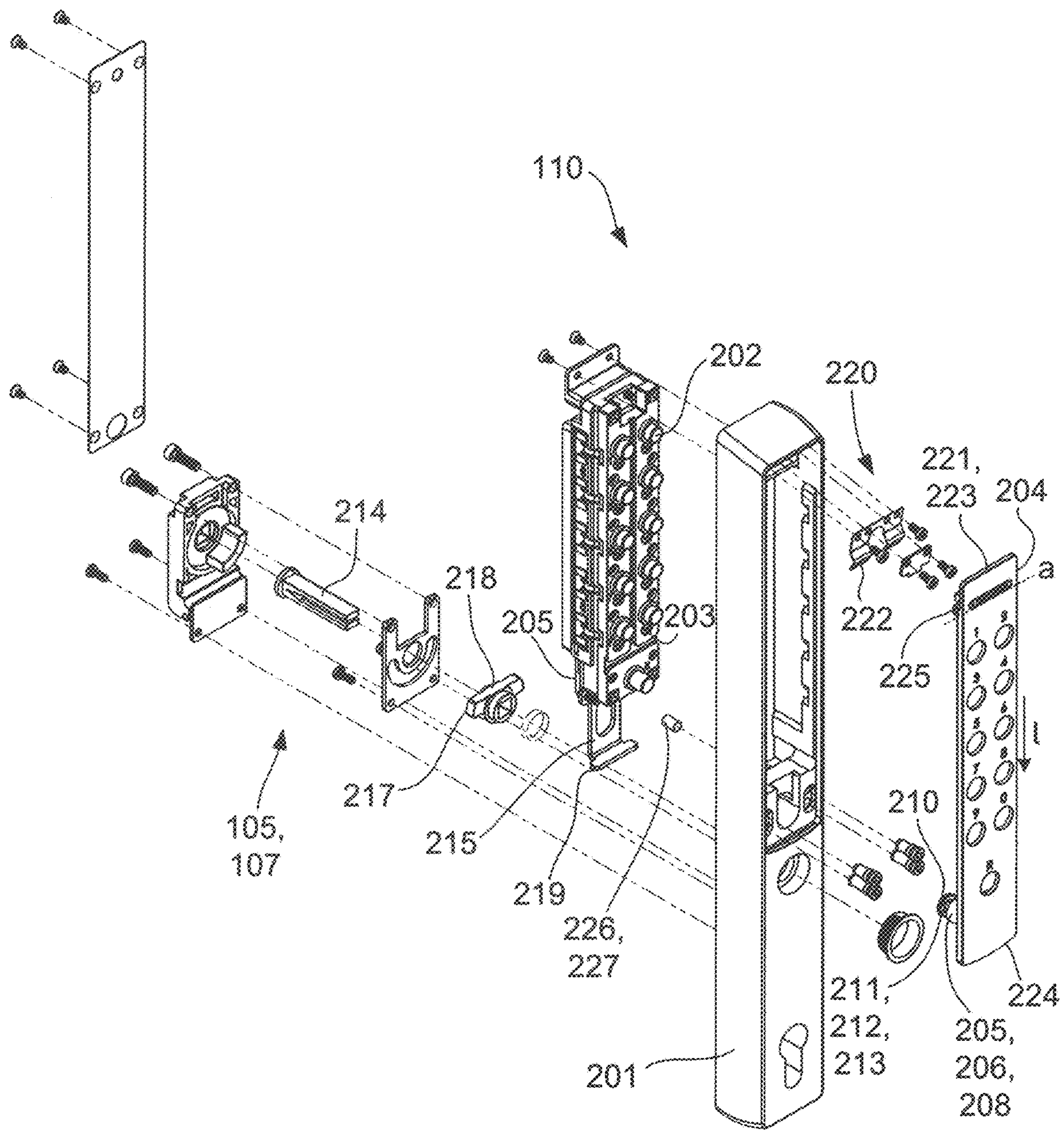
FIG. 2*a* shows a front isometric, exploded view of a combination locking mechanism of a combination lock according to the present disclosure.
Figure 2B:
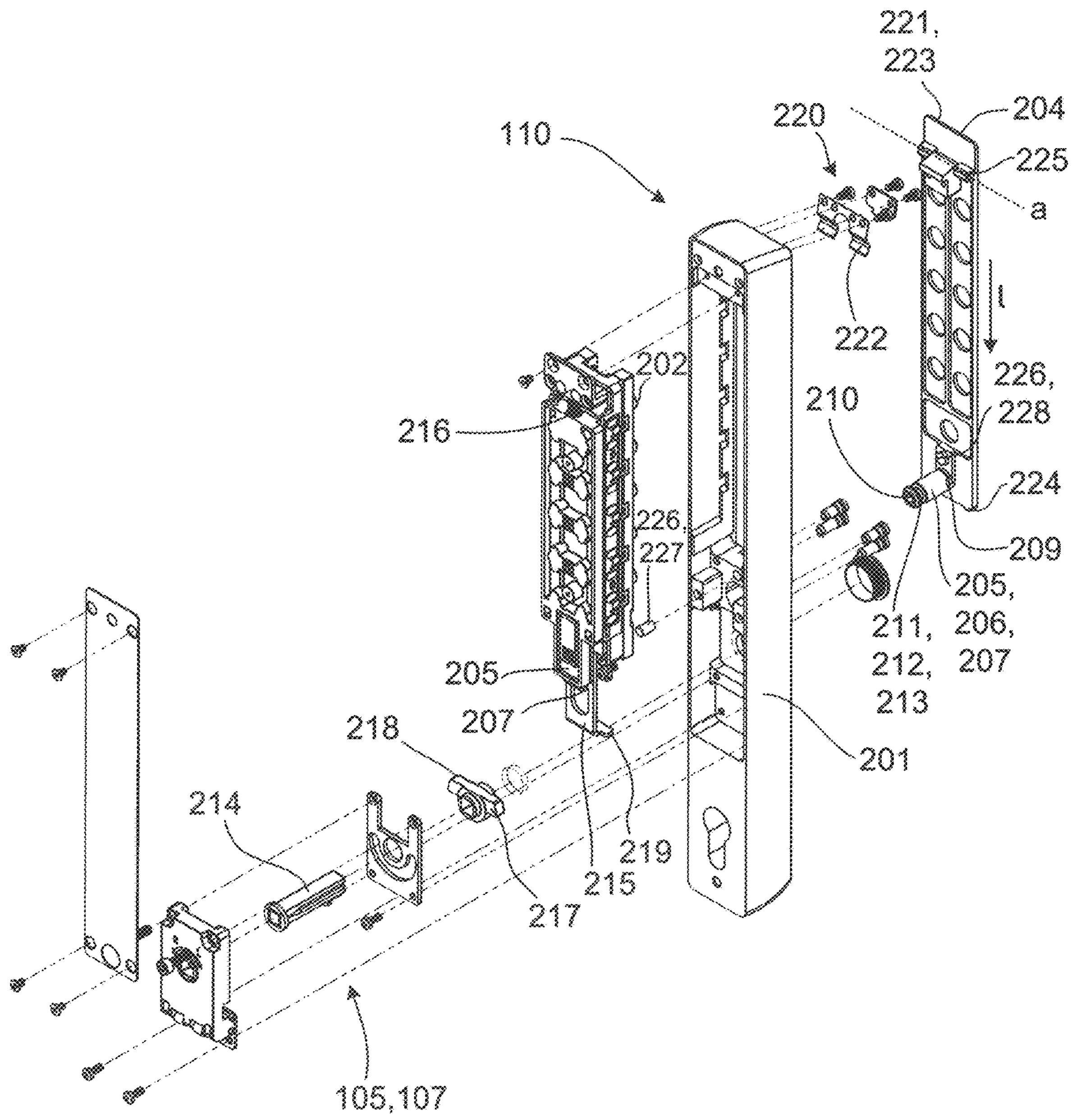
FIG. 2*b* shows a rear isometric, exploded view of a combination locking mechanism of a combination lock according to the present disclosure.

FIG. 2*a* shows a front view and FIG. 2*b* shows a rear view of an isometric, exploded view of a combination lock according to the present disclosure.

The combination lock comprises a lock assembly 105 with a latch bolt actuating mechanism 107 (only partially shown) and a combination locking mechanism 110. The combination locking mechanism 110 is moveable between a blocking state and an unblocking state and configured to prevent the latch bolt actuating mechanism 107 to move the latch bolt from its latched position when the combination locking mechanism 110 is in its blocking state and to allow the latch bolt actuating mechanism 107 to move the latch bolt from its latched position when the combination locking mechanism 110 is in its unblocking state. The combination locking mechanism 110 comprises a frame 201, a combination input means 202 mounted on the frame 201 and configured to move the combination locking mechanism 110 to its unblocking state upon receiving a combination as input, a combination alteration means 203 mounted on the frame 201 and configured to allow a user to alter the combination, and a cover 204. The cover 204 is moveably mounted on the frame 201 between an open position in which the combination alteration means 203 are accessible by a user, and a closed position in which the combination alteration means 203 are not accessible by a user, and the cover 204 is moveable from its closed position to its open position when the combination locking mechanism 110 is in its unblocking state and the latch bolt actuating mechanism 107 is in its actuated state.

The combination locking mechanism 110 further comprises a cover locking means 205 moveable between a locking state in which the cover 204, when in its closed position, is prevented from leaving its closed position, to an unlocking state in which the cover 204 is allowed to move to its open position.

The cover locking means 205 comprise a catch 206 mounted on the cover 204, and a catch keeper 207 mounted on the frame 201 and configured to keep the catch 206 when the cover locking means 205 is in its locking state and the cover 204 is in its closed position.

The catch 206 comprises a striker bolt 208 extending between a first striker bolt end 209 and a second striker bolt end 210 with the striker bolt 208 being mounted on the cover 204 at the first striker bolt end 209, the striker bolt 208 comprising a recess 211, by preference a groove 212, by further preference a circumferential groove 213, and the catch keeper 207 comprises a free end which extends into the recess 211 when the catch keeper 207 is in its keeping position and the cover 204 is in its closed position.

The latch bolt actuating mechanism 107 comprises a spindle 214 rotatably connected to the lock assembly 105 and configured to be moved by a driver, and the combination locking mechanism 110 comprises a check slide 215 slidably mounted on the frame 201 between a checking position in which the check slide 215 is configured to prevent rotation of the spindle 214, and an unchecking position, and a check slide biasing member 216 biasing the check slide 215 to its checking position, wherein the check slide 215 is slidable when the combination locking mechanism 110 is in its unblocking state, and wherein the check slide 215 is fixed in its checking position when the combination locking mechanism 110 is in its blocking state.

A spindle follower 217 is mounted on the spindle 214. The spindle follower 217 has a non-cylindrical outer surface which defines a spindle follower engagement surface 218, and the check slide 215 comprises a check slide engagement surface 219, the check slide engagement surface 219 abutting the spindle follower engagement surface 218 when the check slide 215 is in its checking position. When the latch bolt actuating mechanism 107 is moved from its rest state to its actuated state and the combination locking mechanism 110 is in its unblocking state, the spindle follower 217 is configured to move the check slide 215 to its unchecking position.

The catch keeper 207 is slidably mounted on the check slide 215, wherein the catch keeper 207 is in its releasing position when the check slide 215 is in its unchecking position.

The cover 204 is pivotally connected to the frame 201, the combination locking mechanism 110 further comprising temporary fixation means 220 configured to hold a free end of the cover 221 when the cover 204 is in its open position, the temporary fixation means 220 preferably comprising a leaf spring 222.

The cover 204 extends between a first cover end 223 and a second cover end 224 in a longitudinal cover direction 1, the cover 204 is connected to the frame 201 with a revolute joint 225, the axis of rotation a of the revolute joint 225 being transverse to the longitudinal cover direction 1 and located between the first cover end 223 and the second cover end 224, and the cover 204 is configured to be moved from its closed position to its open position by pressing the cover 204 between the first cover end 223 and the axis of rotation a of the revolute joint 225.

The combination locking mechanism 110 comprises a cover biasing member 226 biasing the cover 204 to its closed position. The cover biasing member 226 comprises a magnet 227 and a magnetic catch 228, jointly biasing the cover 204 to its closed position, especially when the cover 204 is in its closed position.

Figure 3A:
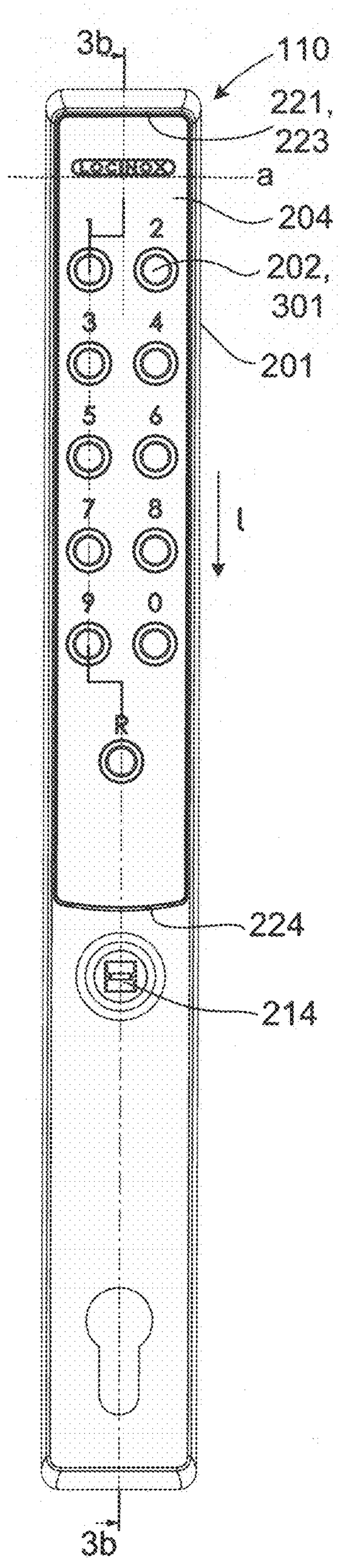
FIG. 3*a* shows a front view of the combination locking mechanism of a combination lock according to the present disclosure with the catch keeper in its keeping position.
Figure 3B:
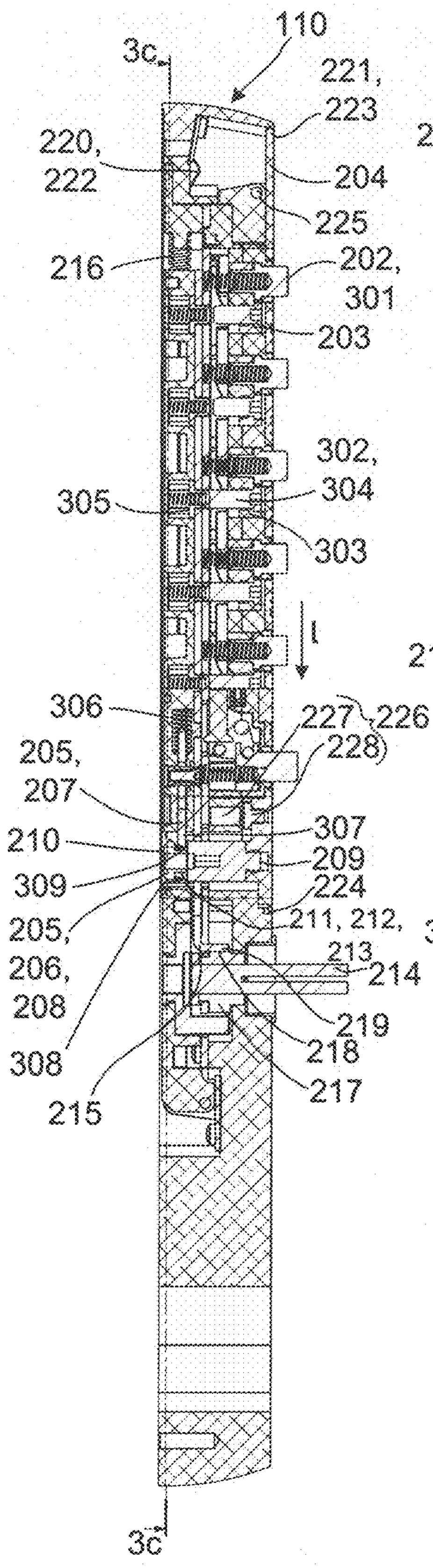
FIG. 3*b* shows a sectional side view of the combination locking mechanism along A-A indicated in FIG. 3*a*.
Figure 3C:
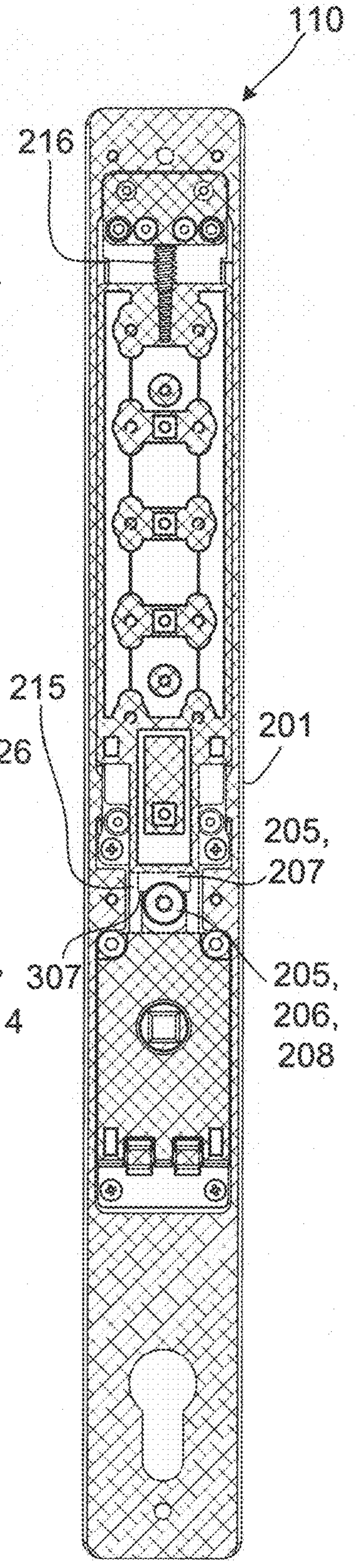
FIG. 3*c* shows a sectional front view of the combination locking mechanism along B-B indicated in FIG. 3*b*.

FIG. 3*a* shows a front view of the combination locking mechanism 110. FIG. 3*b* shows a sectional side view of the combination locking mechanism 110 along A-A indicated in FIG. 3*a*. FIG. 3*c* shows a sectional front view of the combination locking mechanism 110 along B-B indicated in FIG. 3*b*. Apart from the combination locking mechanism 110 of the combination lock according to the present disclosure, FIG. 3 also shows a spindle 214 from a latch bolt actuating mechanism (only partially shown) with a latch bolt moveable between a latched position and an unlatched position (not shown) of the combination lock according to the disclosure.

The combination locking mechanism 110 is moveable between a blocking state and an unblocking state and configured to prevent the latch bolt actuating mechanism to move the latch bolt from its latched position when the combination locking mechanism 110 is in its blocking state and to allow the latch bolt actuating mechanism to move the latch bolt from its latched position when the combination locking mechanism 110 is in its unblocking state. The combination locking mechanism 110 is in its blocking state. The combination locking mechanism 110 comprises a frame 201 and a combination input means 202 mounted on the frame 201 and configured to move the combination locking mechanism 110 to its unblocking state upon receiving a combination as input. The combination input means 202 comprise a pushbutton keyboard 301 and a tumbler 302 comprising a base body 303, a code part 304, and a tumbler driver part 305. The combination locking mechanism 110 also comprises a combination alteration means 203 mounted on the frame 201 and configured to allow a user to alter the combination, and a cover 204. The combination alteration means 203 comprise a means for changing the code part of the tumbler of the combination input means 202. The cover 204 is moveably mounted on the frame 201 between an open position in which the combination alteration means 203 are accessible by a user, and a closed position in which the combination alteration means 203 are not accessible by a user, and the cover 204 is moveable from its closed position to its open position when the combination locking mechanism 110 is in its unblocking state and the latch bolt actuating mechanism is in its actuated state. The cover 204 is in its closed position.

The combination locking mechanism 110 comprises a cover locking means 205 moveable between a locking state in which the cover 204, when in its closed position, is prevented from leaving its closed position, to an unlocking state in which the cover 204 is allowed to move to its open position. The cover locking means 205 is in its locking state.

The cover locking means 205 comprise a catch 206 mounted on the cover 204, and a catch keeper 207 mounted on the frame 201 and configured to keep the catch 206 when the cover locking means 205 is in its locking state and the cover 204 is in its closed position.

The catch keeper 207 is moveably connected to the frame 201 between a keeping position and a releasing position, the cover locking means 205 further comprising a catch keeper biasing member 306 comprising a compression spring and biasing the catch keeper 207 to its keeping position, wherein the catch keeper 207 is configured to be urged against the catch keeper biasing member 306 into its releasing position, when the cover locking means 205 are in the locking state and the cover 204 moves from an open to a closed position. The catch keeper 207 is in its keeping position.

The catch 206 comprises a striker bolt 208 extending between a first striker bolt end 209 and a second striker bolt end 210 with the striker bolt 208 being mounted on the cover 204 at the first striker bolt end 209, the striker bolt 208 comprising a recess 211, by preference a groove 212, by further preference a circumferential groove 213, and the catch keeper 207 comprises a free end 307 which extends into the recess 211 when the catch keeper 207 is in its keeping position and the cover 204 is in its closed position.

The striker bolt 208 comprises a bevel at the second striker bolt end 210 and the free end of the catch keeper 307 comprises a bevel, the striker bolt bevel 308 being configured to engage with the catch keeper bevel 309 to urge the catch keeper 207 against the catch keeper biasing member 306 into its releasing position when the cover 204 moves from an open to a closed position.

The latch bolt actuating mechanism comprises a spindle 214 rotatably connected to the lock assembly 105 and configured to be moved by a driver, and the combination locking mechanism 110 further comprises a check slide 215 slidably mounted on the frame 201 between a checking position in which the check slide 215 is configured to prevent rotation of the spindle 214, and an unchecking position, and a check slide biasing member 216 comprising a compression spring and biasing the check slide 215 to its checking position. The check slide 215 is slidable when the combination locking mechanism 110 is in its unblocking state, and the check slide 215 is fixed in its checking position when the combination locking mechanism 110 is in its blocking state. The check slide 215 is in its checking position.

A spindle follower 217 is mounted on the spindle 214, the spindle follower 217 having a non-cylindrical outer surface which defines a spindle follower engagement surface 218, and the check slide 215 comprises a check slide engagement surface 219, the check slide engagement surface 219 abutting the spindle follower engagement surface 218 when the check slide 215 is in its checking position.

When the latch bolt actuating mechanism is moved from its rest state to its actuated state and the combination locking mechanism 110 is in its unblocking state, the spindle follower 217 is configured to move the check slide 215 to its unchecking position.

The catch keeper 207 is moveably mounted on the check slide 215, wherein the catch keeper 207 is in its releasing position when the check slide 215 is in its unchecking position.

The cover 204 is pivotally connected to the frame 201, the combination locking mechanism 110 further comprising temporary fixation means 220 configured to hold a free end of the cover 221 when the cover 204 is in its open position, the temporary fixation means 220 comprising a leaf spring 222.

The cover 204 extends between a first cover end 223 and a second cover end 224 in a longitudinal cover direction 1, the cover 204 is connected to the frame 201 with a revolute joint 225, the axis of rotation a of the revolute joint 225 being transverse to the longitudinal cover direction 1 and located between the first cover end 223 and the second cover end 224. The cover 204 is configured to be moved from its closed position to its open position by pressing the cover 204 between the first cover end 223 and the axis of rotation a of the revolute joint 225.

The combination locking mechanism 110 comprises a cover biasing member 226 biasing the cover 204 to its closed position. The cover biasing member 226 comprises a magnet 227 and a magnetic catch 228, jointly biasing the cover 204 to its closed position, especially when the cover 204 is in its closed position.

Figure 4A:
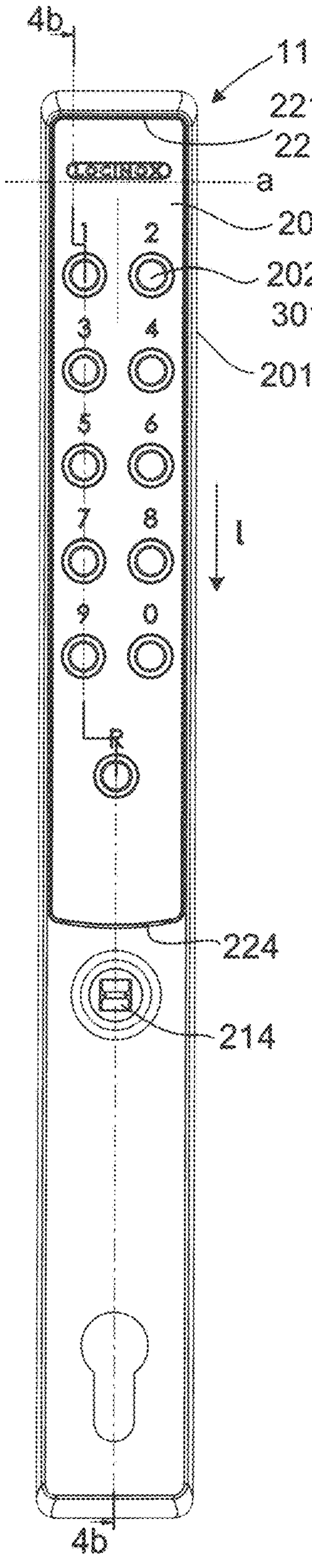
FIG. 4*a* shows a front view of the combination locking mechanism of a combination lock according to the present disclosure with the catch keeper in its releasing position.
Figure 4B:
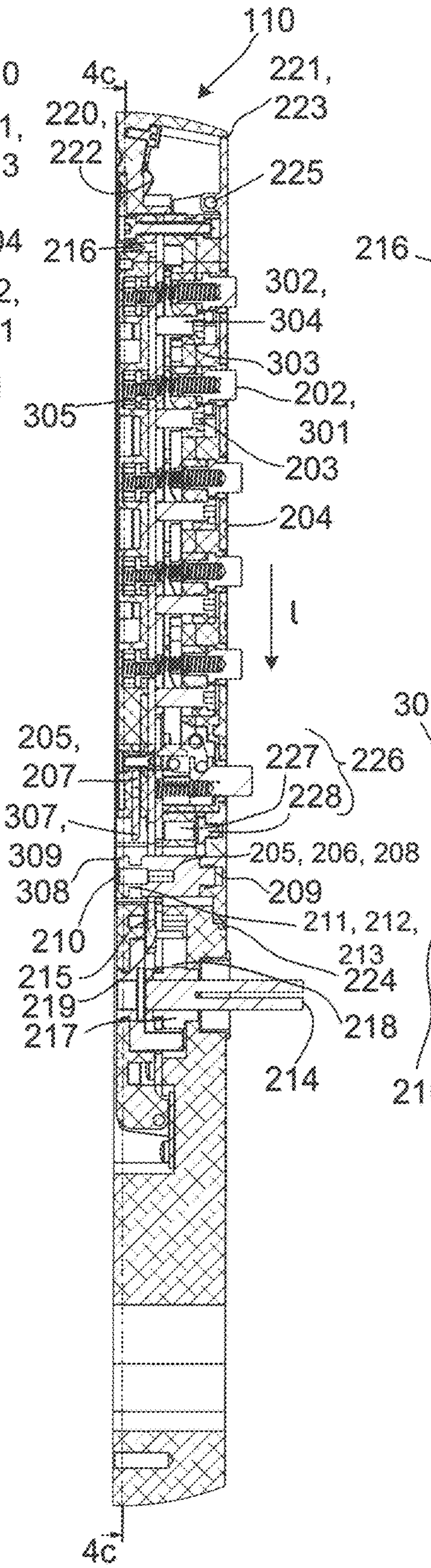
FIG. 4*b* shows a sectional side view of the combination locking mechanism along E-E indicated in FIG. 4*a*.
Figure 4C:
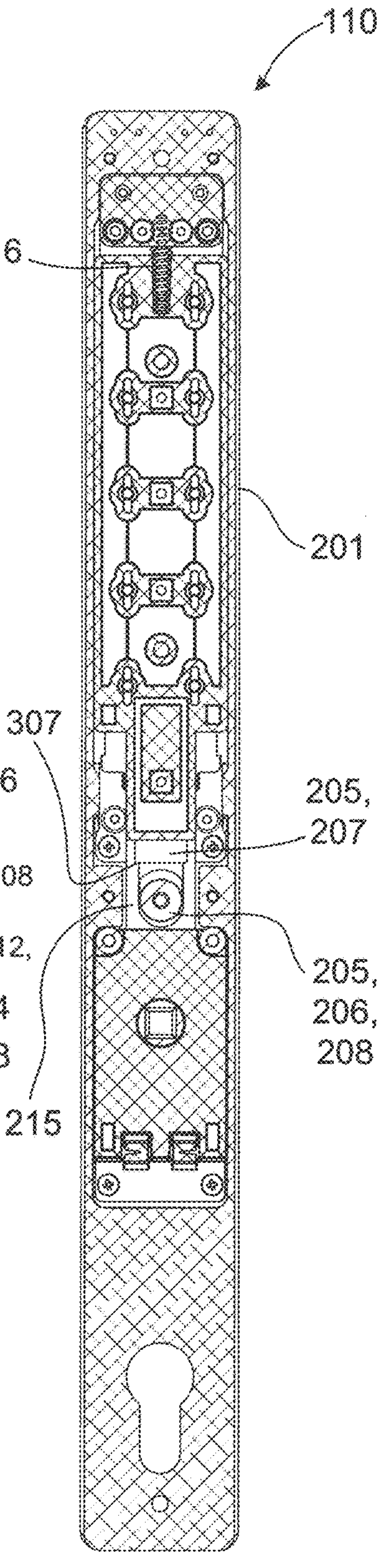
FIG. 4*c* shows a sectional front view of the combination locking mechanism along F-F indicated in FIG. 4*b*.

FIG. 4*a* shows a front view of the combination locking mechanism 110. FIG. 4*b* shows a sectional side view of the combination locking mechanism 110 along E-E indicated in FIG. 4*a*. FIG. 4*c* shows a sectional front view of the combination locking mechanism 110 along F-F indicated in FIG. 4*b*.

The combination locking mechanism 110 of FIG. 4 is the same combination locking mechanism 110 shown in FIG. 3. The components of FIG. 3 are referenced by their reference numbers in FIG. 4. We refer to the description of FIG. 3 for the description of the structural and functional properties of the components. The combination locking mechanism 110 is in its unblocking state. The cover 204 is in its closed position. The cover locking means 205 is in its unlocking state. The catch keeper 207 is in its releasing position. The check slide 215 is in its unchecking position.

Figure 5:
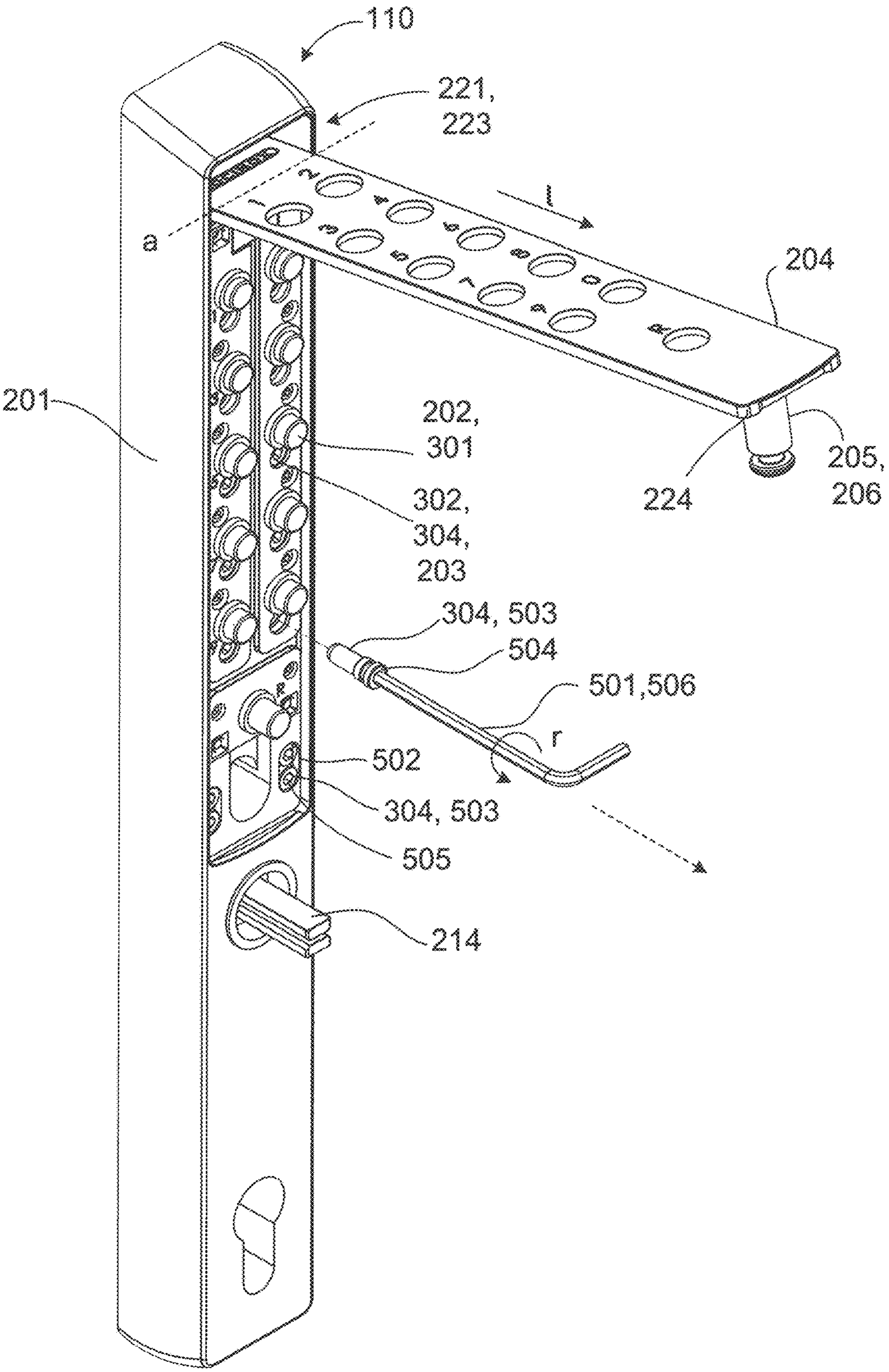
FIG. 5 shows an isometric view of a combination locking mechanism of a combination lock according to the present disclosure with the cover in its open position. It also partially shows altering the combination with the combination alteration means from a method for using a combination lock according to the present disclosure.

FIG. 5 shows an isometric view of a combination locking mechanism 110 of a combination lock according to the present disclosure with the cover 204 in its open position. Apart from the combination locking mechanism 110 of the combination lock according to the present disclosure, FIG. 5 also shows a spindle 214 from a latch bolt actuating mechanism (only partially shown) with a latch bolt moveable between a latched position and an unlatched position (not shown) of the combination lock according to the disclosure.

The combination locking mechanism 110 is moveable between a blocking state and an unblocking state and configured to prevent the latch bolt actuating mechanism to move the latch bolt from its latched position when the combination locking mechanism 110 is in its blocking state and to allow the latch bolt actuating mechanism to move the latch bolt from its latched position when the combination locking mechanism 110 is in its unblocking state.

The combination locking mechanism 110 comprises a frame 201, and a combination input means 202 mounted on the frame 201 and configured to move the combination locking mechanism 110 to its unblocking state upon receiving a combination as input. The combination input means 202 comprise a pushbutton keyboard 301, comprising a tumbler 302 comprising a base body, a code part 304, and a tumbler driver part. The combination locking mechanism 110 comprises also a combination alteration means 203 mounted on the frame 201 and configured to allow a user to alter the combination, and a cover 204. The cover 204 is moveably mounted on the frame 201 between an open position in which the combination alteration means 203 are accessible by a user, and a closed position in which the combination alteration means 203 are not accessible by a user. The cover 204 is moveable from its closed position to its open position when the combination locking mechanism 110 is in its unblocking state and the latch bolt actuating mechanism is in its actuated state. The cover 204 is in its open position.

The combination locking mechanism 110 comprises a cover locking means 205 moveable between a locking state in which the cover 204, when in its closed position, is prevented from leaving its closed position, to an unlocking state in which the cover 204 is allowed to move to its open position.

The cover locking means 205 comprise a catch 206 mounted on the cover 204 and a catch keeper mounted on the frame 201 and configured to keep the catch 206 when the cover locking means 205 is in its locking state and the cover 204 is in its closed position.

The cover 204 is pivotally connected to the frame 201, the combination locking mechanism 110 further comprising temporary fixation means configured to hold a free end of the cover 221 when the cover 204 is in its open position. The cover 204 extends between a first cover end 223 and a second cover end 224 in a longitudinal cover direction 1, the cover 204 is connected to the frame 201 with a revolute joint, the axis of rotation a of the revolute joint being transverse to the longitudinal cover direction 1 and located between the first cover end 223 and the second cover end 224, and the cover 204 is configured to be moved from its closed position to its open position by pressing the cover 204 between the first cover end 223 and the axis of rotation a of the revolute joint.

The combination alteration means 203 comprise a means for changing the code part of the tumbler 501 of the combination input means 202, and a storage location 502 for a code part 304 of a tumbler 302. The code part 304 of a tumbler 302 comprises a threaded bolt 503 with a head 504 comprising an internal hexagonal recess 505, the code part 304 configured to be attached to the base body of the tumbler 302.

The means for changing the code part of the tumbler 501 of the combination input means 202 comprise a hex key 506 removably connected to the combination alteration means 203. The hex key 506 is configured to attach a code part 304 of a tumbler 302 to the base body of a tumbler 302.

FIG. 5 also partially shows altering the combination with the combination alteration means from a method for using a combination lock according to the present disclosure. Altering the combination with the combination alteration means, comprises turning a hex key 506 in a counter-clockwise movement r to remove a code part 304 of a tumbler 302 from a base body of the tumbler 302.

Figure 6:
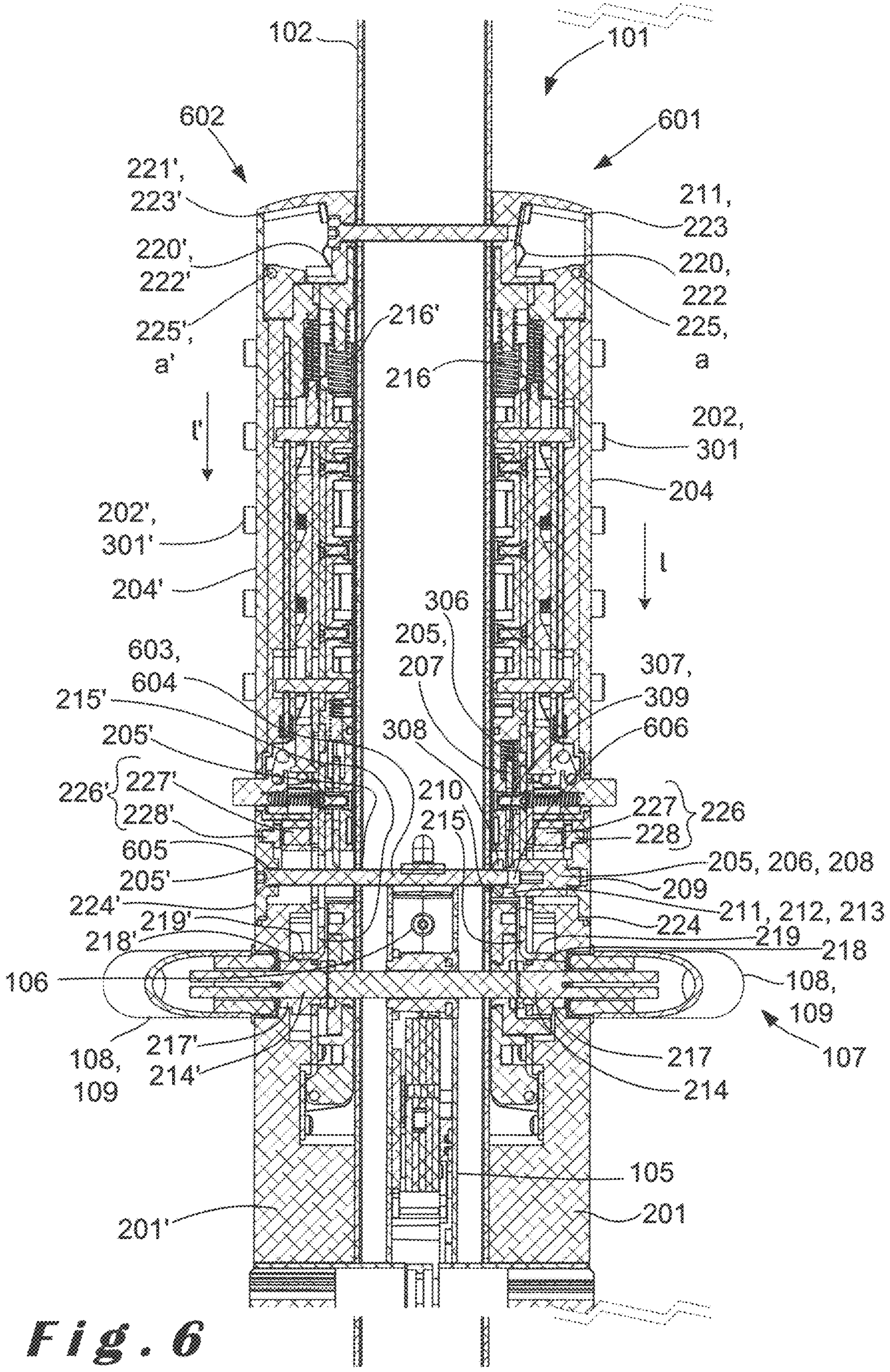
FIG. 6 shows a sectional view of a combination lock according to the present disclosure.

FIG. 6 shows a sectional view of a combination lock 101 according to the present disclosure.

The combination lock 101 comprises a lock assembly 105 configured to be mounted on the closure member 102, that is mounted on a closure member 102, a first combination locking mechanism 601 and a second combination locking mechanism 602.

The lock assembly 105 comprises a latch bolt 106 moveable, in particular slidable, between a latched position and an unlatched position. The latch bolt 106 is in its latched position. The lock assembly 105 further comprises a latch bolt actuating mechanism 107 moveable between a rest state and an actuated state and configured to move the latch bolt 106 from its latched position to its unlatched position. The latch bolt actuating mechanism 107 comprises a handle 109 and is in its rest state.

The first combination locking mechanism 601 is moveable between a blocking state and an unblocking state and configured to prevent the latch bolt actuating mechanism 107 to move the latch bolt 106 from its latched position when the first combination locking mechanism 601 is in its blocking state and to allow the latch bolt actuating mechanism 107 to move the latch bolt 106 from its latched position when the first combination locking mechanism 601 is in its unblocking state. The first combination locking mechanism 601 is in its blocking state. The first combination locking mechanism 601 comprises a frame 201, and a combination input means 202 mounted on the frame 201 and configured to move the first combination locking mechanism 601 to its unblocking state upon receiving a first combination as input. The combination input means 202 comprise a pushbutton keyboard 301. The first combination locking mechanism 601 comprises also a combination alteration means mounted on the frame 201 and configured to allow a user to alter the first combination, and a cover 204. The cover 204 is moveably mounted on the frame 201 between an open position in which the combination alteration means are accessible by a user, and a closed position in which the combination alteration means are not accessible by a user. The cover 204 is in its closed position. The cover 204 is moveable from its closed position to its open position when the first combination locking mechanism 601 is in its unblocking state and the latch bolt actuating mechanism 107 is in its actuated state.

The first combination locking mechanism 601 comprises a cover locking means 205 moveable between a locking state in which the cover 204, when in its closed position, is prevented from leaving its closed position, to an unlocking state in which the cover 204 is allowed to move to its open position. The cover locking means 205 are in their locking state. The cover locking means 205 comprise a catch 206 mounted on the cover 204 and a catch keeper 207 mounted on the frame 201 and configured to keep the catch 206 when the cover locking means 205 is in its locking state and the cover 204 is in its closed position. The catch keeper 207 is moveably connected to the frame 201 between a keeping position and a releasing position. The catch keeper 207 is in its keeping position. The cover locking means 205 further comprise a catch keeper biasing member 306 biasing the catch keeper 207 to its keeping position. The catch keeper biasing member 306 comprises a compression spring. The catch keeper 207 keeps the catch 206 when the catch keeper 207 is in the keeping position and the cover 204 is in its closed position. The catch keeper 207 is configured to be urged against the catch keeper biasing member 306 into its releasing position, when the cover locking means 205 are in the locking state and the cover 204 moves from an open to a closed position.

The catch 206 comprises a striker bolt 208 extending between a first striker bolt end 209 and a second striker bolt end 210 with the striker bolt 208 being mounted on the cover 204 at the first striker bolt end 209, the striker bolt 208 comprising a recess 211, in particular a groove 212, in particular a circumferential groove 213, and the catch keeper 207 comprises a free end 307 extending into the recess 211 when the catch keeper 207 is in its keeping position and the cover 204 is in its closed position. The striker bolt 208 comprises a bevel at the second striker bolt end 210 and the free end of the catch keeper 307 comprises a bevel, the striker bolt bevel 308 being configured to engage with the catch keeper bevel 309 to urge the catch keeper 207 against the catch keeper biasing member 306 into its releasing position when the cover 204 moves from an open to a closed position.

The latch bolt actuating mechanism 107 comprises a spindle 214 rotatably connected to the lock assembly 105 and configured to be moved by a driver 108, and the first combination locking mechanism 601 further comprises a check slide 215 slidably mounted on the frame 201 between a checking position in which the check slide 215 is configured to prevent rotation of the spindle 214, and an unchecking position, and a check slide biasing member 216 biasing the check slide 215 to its checking position, wherein the check slide 215 is slidable when the first combination locking mechanism 601 is in its unblocking state, and wherein the check slide 215 is fixed in its checking position when the first combination locking mechanism 601 is in its blocking state. The check slide biasing member 216 comprises a compression spring. The check slide 215 is in its checking position.

A spindle follower 217 is mounted on the spindle 214, the spindle follower 217 having a non-cylindrical outer surface which defines a spindle follower engagement surface 218, and the check slide 215 comprises a check slide engagement surface 219, the check slide engagement surface 219 abutting the spindle follower engagement surface 218 when the check slide 215 is in its checking position. When the latch bolt actuating mechanism 107 is moved from its rest state to its actuated state and the first combination locking mechanism 601 is in its unblocking state, the spindle follower 217 is configured to move the check slide 215 to its unchecking position.

The catch keeper 207 is moveably, in particular slidably, mounted on the check slide 215, wherein the catch keeper 207 is in its releasing position when the check slide 215 is in its unchecking position.

The cover 204 is pivotally connected to the frame 201, the first combination locking mechanism 601 further comprising temporary fixation means 220 configured to hold a free end of the cover 221 when the cover 204 is in its open position. The temporary fixation means 220 comprise a leaf spring 222. The cover 204 extends between a first cover end 223 and a second cover end 224 in a longitudinal cover direction 1, the cover 204 is connected to the frame 201 with a revolute joint 225, the axis of rotation a of the revolute joint 225 being transverse to the longitudinal cover direction 1 and located between the first cover end 223 and the second cover end 224, and the cover 204 is configured to be moved from its closed position to its open position by pressing the cover 204 between the first cover end 223 and the axis of rotation a of the revolute joint 225.

The first combination locking mechanism 601 comprises a cover biasing member 226 biasing the cover 204 to its closed position. The cover biasing member 226 comprises a permanent magnet 227, and a magnetic catch 228, jointly biasing the cover 204 to its closed position, especially when the cover 204 is in its closed position. A magnetic catch is an element or part thereof which is attracted by a magnet, for example an element or part thereof manufactured from a ferromagnetic, optionally soft ferromagnetic, or ferrimagnetic material.

The second combination locking mechanism 602 is moveable between a blocking state and an unblocking state and configured to prevent the latch bolt actuating mechanism 107 to move the latch bolt 106 from its latched position when the second combination locking mechanism 602 is in its blocking state and to allow the latch bolt actuating mechanism 107 to move the latch bolt 106 from its latched position when the second combination locking mechanism 602 is in its unblocking state. The second combination locking mechanism 602 is in its blocking state. The second combination locking mechanism 602 comprises a frame 201', and a combination input means 202' mounted on the frame 201' and configured to move the second combination locking mechanism 602 to its unblocking state upon receiving a first combination as input. The combination input means 202' comprise a pushbutton keyboard 301'. The second combination locking mechanism 602 comprises also a combination alteration means mounted on the frame 201' and configured to allow a user to alter the first combination, and a cover 204'. The cover 204' is moveably mounted on the frame 201' between an open position in which the combination alteration means are accessible by a user, and a closed position in which the combination alteration means are not accessible by a user. The cover 204' is in its closed position. The cover 204' is moveable from its closed position to its open position when the second combination locking mechanism 602 is in its unblocking state and the latch bolt actuating mechanism 107 is in its actuated state.

The second combination locking mechanism 602 comprises a cover locking means 205' moveable between a locking state in which the cover 204', when in its closed position, is prevented from leaving its closed position, to an unlocking state in which the cover 204' is allowed to move to its open position. The cover locking means 205' are in their locking state.

The latch bolt actuating mechanism 107 comprises a spindle 214 rotatably connected to the lock assembly 105 and configured to be moved by a driver 108, and the second combination locking mechanism 602 further comprises a check slide 215' slidably mounted on the frame 201' between a checking position in which the check slide 215' is configured to prevent rotation of the spindle 214, and an unchecking position, and a check slide biasing member 216' biasing the check slide 215' to its checking position, wherein the check slide 215' is slidable when the second combination locking mechanism 602' is in its unblocking state, and wherein the check slide 215' is fixed in its checking position when the second combination locking mechanism 602 is in its blocking state. The check slide biasing member 216' comprises a compression spring. The check slide 215' is in its checking position.

A spindle follower 217' is mounted on the spindle 214, the spindle follower 217' having a non-cylindrical outer surface which defines a spindle follower engagement surface 218', and the check slide 215' comprises a check slide engagement surface 219', the check slide engagement surface 219' abutting the spindle follower engagement surface 218' when the check slide 215' is in its checking position. When the latch bolt actuating mechanism 107 is moved from its rest state to its actuated state and the second combination locking mechanism 602 is in its unblocking state, the spindle follower 217' is configured to move the check slide 215' to its unchecking position.

The cover 204' is pivotally connected to the frame 201', the second combination locking mechanism 602 further comprising temporary fixation means 220' configured to hold a free end of the cover 221' when the cover 204' is in its open position. The temporary fixation means 220' comprise a leaf spring 222'. The cover 204' extends between a first cover end 223' and a second cover end 224' in a longitudinal cover direction 1', the cover 204' is connected to the frame 201' with a revolute joint 225', the axis of rotation a' of the revolute joint 225' being transverse to the longitudinal cover direction 1' and located between the first cover end 223' and the second cover end 224', and the cover 204' is configured to be moved from its closed position to its open position by pressing the cover 204' between the first cover end 223' and the axis of rotation a' of the revolute joint 225'.

The second combination locking mechanism 602 comprises a cover biasing member 226' biasing the cover 204' to its closed position. The cover biasing member 226' comprises a permanent magnet 227', and a magnetic catch 228', jointly biasing the cover 204' to its closed position, especially when the cover 204' is in its closed position. A magnetic catch is an element or part thereof which is attracted by a magnet, for example an element or part thereof manufactured from a ferromagnetic, optionally soft ferromagnetic, or ferrimagnetic material.

The combination lock 101 further comprises a securing means 603 configured to detachably connect the cover 204 of the first combination locking mechanism 601 to the frame 201 of the first combination locking mechanism 601 and the cover 204' of the second combination locking mechanism 602 to the frame 201' of the second combination locking mechanism 602. The securing means 603 are moveable from a first secured state in which the cover 204 of the first combination locking mechanism 601, when in its closed position, is prevented from leaving its closed position, to a first unsecured state in which the cover 204 of the first combination locking mechanism 601 is allowed to move to its open position. The securing means 603 are moveable from a second secured state in which the cover 204' of the second combination locking mechanism 602, when in its closed position, is prevented from leaving its closed position, to a second unsecured state in which the cover 204' of the second combination locking mechanism 602 is allowed to move to its open position. The securing means 603 are in their first secured state and their second secured state. The securing means 603 comprise a securing bolt 604. The securing bolt 604 connects the cover 204' of the second combination locking mechanism 602 to the frame 201' of the second combination locking mechanism 602 by bolting the cover 204' of the second combination locking mechanism 602 through a securing through hole 605 in the cover 204' of the second combination locking mechanism 602 to the lock assembly 105. The securing bolt 604 connects the cover 204 of the first combination locking mechanism 601 to the frame 201 of the first combination locking mechanism 601 by bolting the lock assembly 105 to the cover 204 of the first combination locking mechanism 601 via a securing recess 606 in the striker bolt 208 of the first combination locking mechanism 601.

A similar securing means can be applied to a combination lock according to the disclosure with only one combination locking mechanism, for example by comprising a securing bolt connecting the cover of the combination locking mechanism to the frame of the combination locking mechanism by bolting the cover through a securing through hole in the cover to the lock assembly, or for example, by comprising a securing bolt connecting the cover to the frame by bolting the lock assembly to the cover via a securing recess in the striker bolt.

Figure 8:
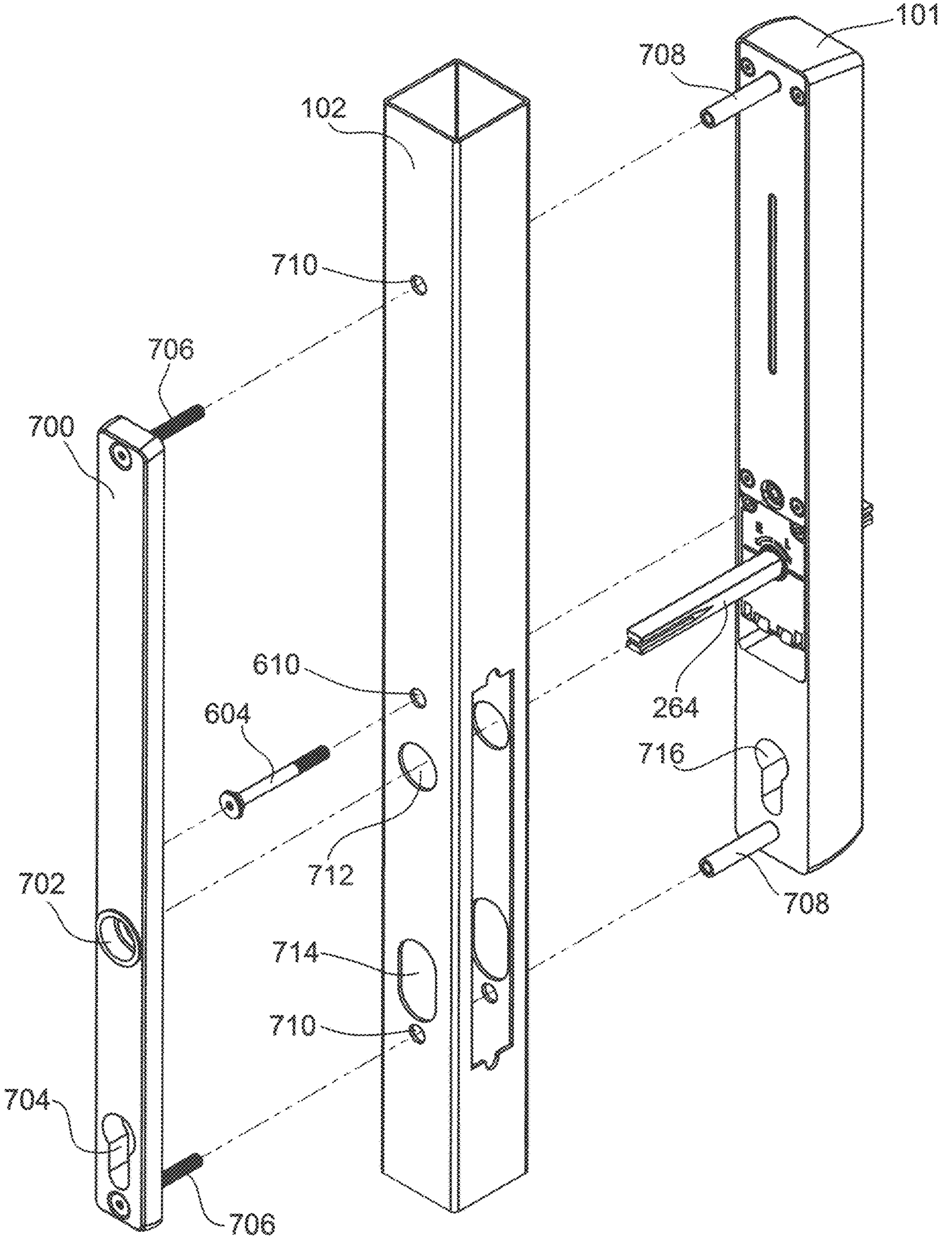
FIG. 8 shows an isometric, exploded view of a combination lock according to the present disclosure to be mounted on a closure member.
Figure 9:
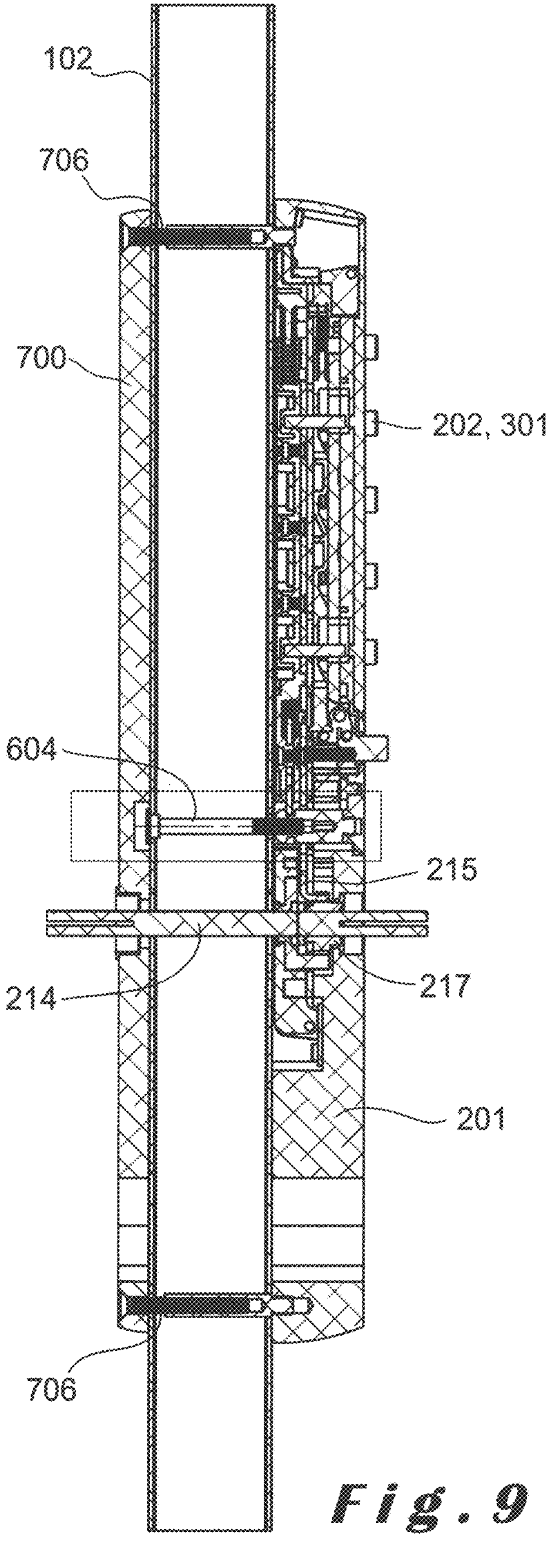
FIG. 9 shows a vertical cross-sectional view through the assembled closure member and combination lock of FIG. 8.
Figure 10:
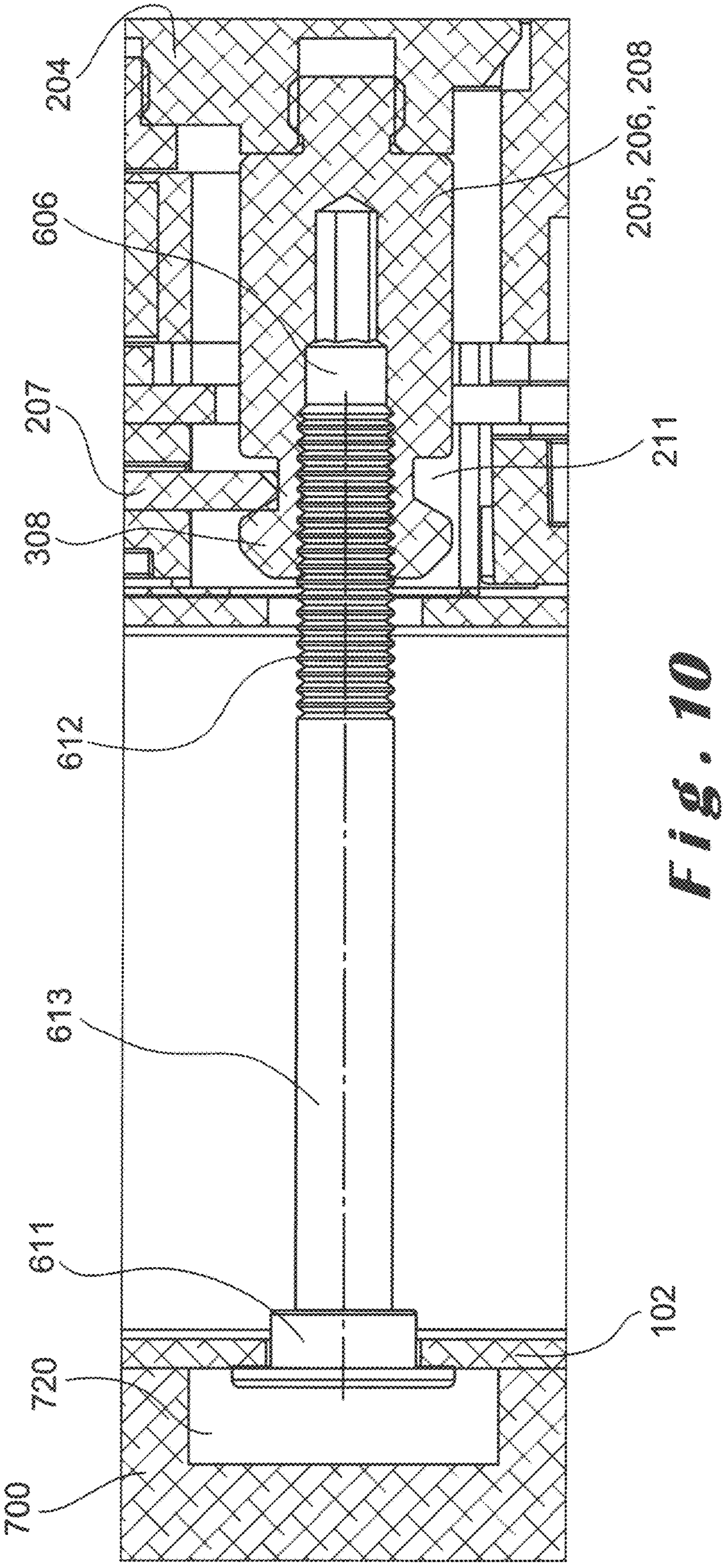
FIG. 10 shows a detail of FIG. 9.

Such an embodiment is shown in FIGS. 8 to 10. FIG. 8 shows the combination lock 101 which is to be mounted on the closure member 102. In the illustrated embodiment, the combination lock 101 is intended to also receiver lock cylinder (not shown) so that a lock cylinder opening 716 is provided by which the lock cylinder can be accessible from the front of the combination lock. The closure member 102 is provided with several through-openings, namely:

- a spindle through-opening 712 through which the spindle 214 extends;
- a lock cylinder through-opening 714 through which a lock cylinder (not shown) extends;
- mounting openings 710 to mount the combination lock 101 to the closure member; and
- a securing through-opening 610 through which the securing bolt 604 extends.

The combination lock 101 is mounted to the closure member 102 using a back cover 700 which engages the opposing side of the closure member 102. The back cover 700 also includes a spindle opening 702 and a cylinder lock opening 704 to allow placing the spindle 214 and an optional lock cylinder. The combination lock 101 is connected to the back cover 700 by means of threaded fasteners 706 engaging in sleeves 708 provided on the combination lock 101. Naturally, the fasteners 706 and sleeves 708 may be reversed.

A vertical cross-section of the assembled combination lock 101, closure member 102 and back cover 700 is shown in FIG. 9. A detail of the securing bolt 604 is shown in FIG. 10. FIG. 10 illustrates that the securing member 604 comprises a head 611, a shaft 613 and a threaded area 612. The bolt head 611 is located in a recess 720 provided in the rear of the back cover 700 and is thus not accessible without removing the cover 700. The threaded area 612 engages the striker bolt 208 which is part of the cover locking mechanism 205. The cover 204 to which the striker bolt 208 is attached thus cannot open as long as the securing means 604 have not been removed.

Figure 7:
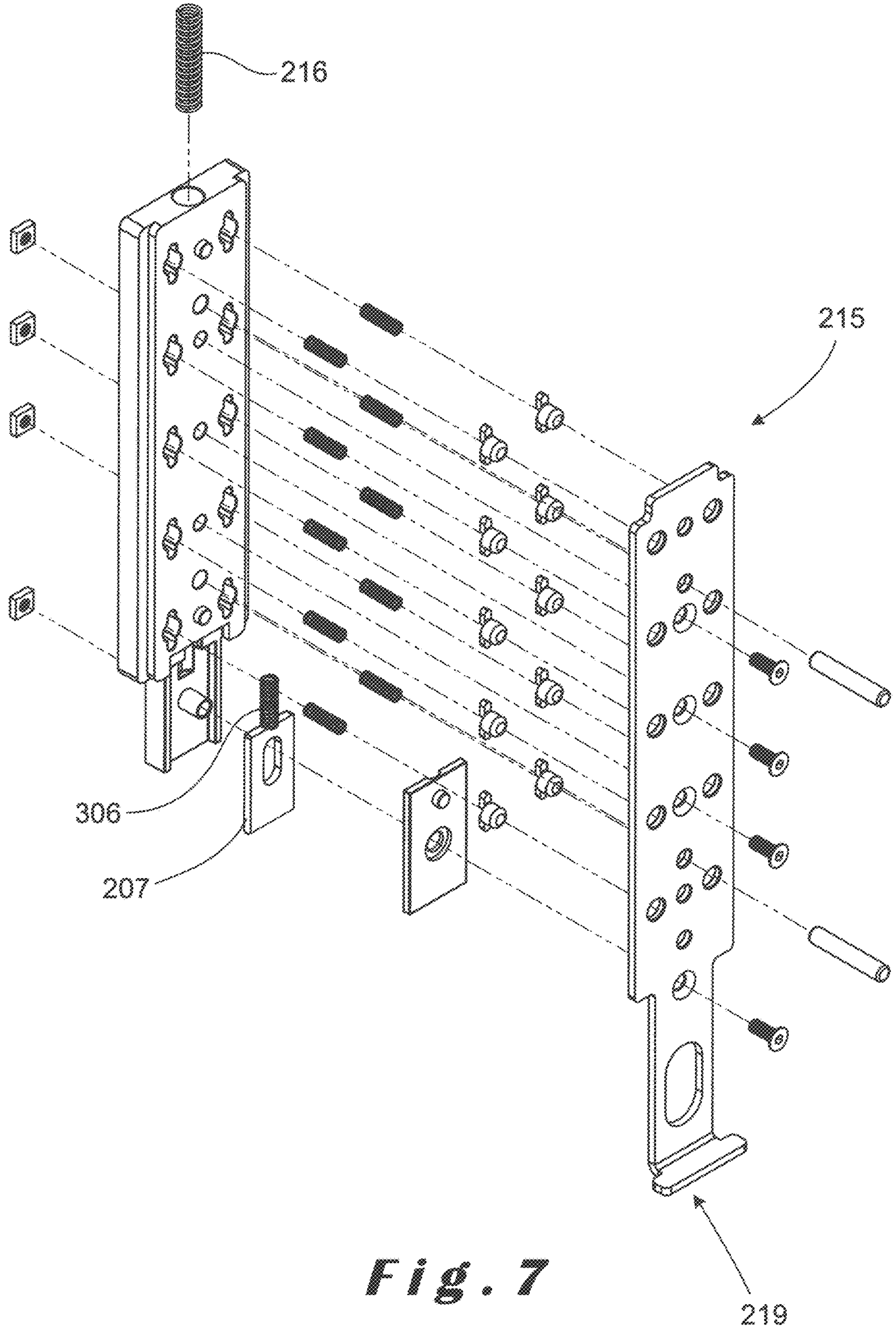
FIG. 7 shows an isometric, exploded view of a check slide of a combination locking mechanism of a combination lock according to the present disclosure.

FIG. 7 shows an isometric, exploded view of a check slide 215 of a combination locking mechanism of a combination lock according to the present disclosure. The combination lock comprises a lock assembly with a latch bolt actuating mechanism with a spindle. The combination locking mechanism is moveable between a blocking state and an unblocking state and comprises a spindle follower, having a non-cylindrical outer surface which defines a spindle follower engagement surface. The combination locking mechanism comprises a cover locking means moveable between a locking state in which the cover, when in its closed position, is prevented from leaving its closed position, to an unlocking state in which the cover is allowed to move to its open position. The cover locking means comprise a catch mounted on the cover and a catch keeper 207 configured to keep the catch when the cover locking means is in its locking state and the cover is in its closed position.

The combination locking mechanism comprises a check slide 215 slidably mounted on the frame between a checking position in which the check slide 215 is configured to prevent rotation of the spindle, and an unchecking position, and a check slide biasing member 216 biasing the check slide 215 to its checking position, wherein the check slide 215 is slidable when the combination locking mechanism is in its unblocking state, and wherein the check slide 215 is fixed in its checking position when the combination locking mechanism is in its blocking state. The check slide biasing member 216 comprises a compression spring. The check slide 215 comprises a check slide engagement surface 219, the check slide engagement surface 219 abutting the spindle follower engagement surface when the check slide 215 is in its checking position. The catch keeper 207 is moveably mounted on the check slide 215, in particular slidably mounted on the check slide 215, between a keeping position and a releasing position, the cover locking means further comprising a catch keeper biasing member 306 biasing the catch keeper 207 to its keeping position. The catch keeper biasing member 306 comprises a compression spring. The catch keeper 207 is in its releasing position when the check slide 215 is in its unchecking position.

Although aspects of the present disclosure have been described with respect to specific embodiments, it will be readily appreciated that these aspects may be implemented in other forms within the scope of the disclosure as defined by the claims.

The invention claimed is:

1. A combination lock for locking a closure member, the combination lock comprising:

a lock assembly configured to be mounted on a closure member, the lock assembly comprising:

a latch bolt moveable between a latched position and an unlatched position, and a latch bolt actuating mechanism moveable between a rest state and an actuated state and configured to move the latch bolt from its latched position to its unlatched position, and a combination locking mechanism moveable between a blocking state and an unblocking state and configured to prevent the latch bolt actuating mechanism to move the latch bolt from its latched position when the combination locking mechanism is in its blocking state and to allow the latch bolt actuating mechanism to move the latch bolt from its latched position when the combination locking mechanism is in its unblocking state, the combination locking mechanism comprising:

a frame, a combination input means mounted on the frame and configured to move the combination locking mechanism to its unblocking state upon receiving a combination as input, a combination alteration means mounted on the frame and configured to allow a user to alter the combination, and a cover, wherein:

the cover is moveably mounted on the frame between an open position in which the combination alteration means are accessible by a user, and a closed position in which the combination alteration means are not accessible by a user, and the cover is moveable from its closed position to its open position only when the combination locking mechanism is in its unblocking state.

2. The combination lock according to claim 1, wherein the combination locking mechanism further comprises a cover locking means moveable between a locking state in which the cover, when in its closed position, is prevented from leaving its closed position, to an unlocking state in which the cover is allowed to move to its open position.

3. The combination lock according to claim 2, wherein the cover locking means are in their locking state:

when the combination locking mechanism is in its blocking state, and when the combination locking mechanism is in its unblocking state and the latch bolt actuation mechanism is in its rest state, and wherein the cover locking means are in their unlocking state when the combination locking mechanism is in its unblocking state and the latch bolt actuation mechanism is in its actuated state.

4. The combination lock according to claim 2, wherein the cover locking means comprise:

a catch mounted on the cover, and a catch keeper mounted on the frame and configured to keep the catch when the cover locking means is in its locking state and the cover is in its closed position.

5. The combination lock according to claim 4, wherein the catch keeper is moveably connected to the frame between a keeping position and a releasing position, the cover locking means further comprising a catch keeper biasing member biasing the catch keeper to its keeping position, wherein the catch keeper is configured to be urged against the catch keeper biasing member into its releasing position, when the cover locking means are in the locking state and the cover moves from an open to a closed position.

6. The combination lock according to claim 5, wherein:

the catch comprises a striker bolt extending between a first striker bolt end and a second striker bolt end with the striker bolt being mounted on the cover at the first striker bolt end, the striker bolt comprising a recess, and the catch keeper comprises a free end which extends into the recess when the catch keeper is in its keeping position and the cover is in its closed position.

7. The combination lock according to claim 6, wherein the striker bolt comprises a bevel at the second striker bolt end and the free end of the catch keeper comprises a bevel, the striker bolt bevel being configured to engage with the catch keeper bevel to urge the catch keeper against the catch keeper biasing member into its releasing position when the cover moves from an open to a closed position.

8. The combination lock according to claim 2, wherein the combination locking mechanism further comprises:

a check slide slidably mounted on the frame between a checking position in which the check slide is configured to prevent rotation of the latch bolt actuating mechanism, and an unchecking position, and a check slide biasing member biasing the check slide to its checking position, wherein the check slide is slidable when the combination locking mechanism is in its unblocking state, and wherein the check slide is fixed in its checking position when the combination locking mechanism is in its blocking state, and wherein the check slide is also part of the cover locking means with the checking position corresponding to the locking state and the unchecking position corresponding to the unlocking state.

9. The combination lock according to claim 8, wherein the cover locking means further comprise a manually operable actuator, such as a pushbutton or a rotatable knob, operatively connected to the check slide and configured for moving the check slide to its unchecking position.

10. The combination lock according to claim 9, wherein the manually operable actuator is part of the latch bolt actuating mechanism.

11. The combination lock according to claim 1, wherein the latch bolt actuating mechanism comprises a spindle rotatably connected to the lock assembly and configured to be moved by a driver, and in that the combination locking mechanism further comprises:

a check slide slidably mounted on the frame between a checking position in which the check slide is configured to prevent rotation of the spindle, and an unchecking position, and a check slide biasing member biasing the check slide to its checking position, wherein the check slide is slidable when the combination locking mechanism is in its unblocking state, and wherein the check slide is fixed in its checking position when the combination locking mechanism is in its blocking state.

12. The combination lock according to claim 11, wherein a spindle follower is mounted on the spindle, the spindle follower having a non-cylindrical outer surface which defines a spindle follower engagement surface, and the check slide comprises a check slide engagement surface, the check slide engagement surface abutting the spindle follower engagement surface when the check slide is in its checking position.

13. The combination lock according to claim 11, wherein, when the latch bolt actuating mechanism is moved from its rest state to its actuated state and the combination locking mechanism is in its unblocking state, the spindle follower is configured to move the check slide to its unchecking position.

14. The combination lock according to claim 1, wherein the cover is pivotally connected to the frame, the combination locking mechanism particularly further comprising temporary fixation means configured to hold a free end of the cover when the cover is in its open position.

15. The combination lock according to claim 14, wherein the temporary fixation means comprise a leaf spring.

16. The combination lock according to claim 1, wherein the cover extends between a first cover end and a second cover end in a longitudinal cover direction, and the cover is connected to the frame with a revolute joint, the axis of rotation of the revolute joint being transverse to the longitudinal cover direction and located between the first cover end and the second cover end.

17. The combination lock according to claim 1, wherein the combination locking mechanism comprises a cover biasing member biasing the cover to its closed position.

18. The combination lock according to claim 17, wherein the cover biasing member comprises a magnet and a magnetic catch, jointly biasing the cover to its closed position.

19. The combination lock according to claim 6, wherein said recess is formed by a circumferential groove.

* * * * *